Patented Aug. 1, 1950

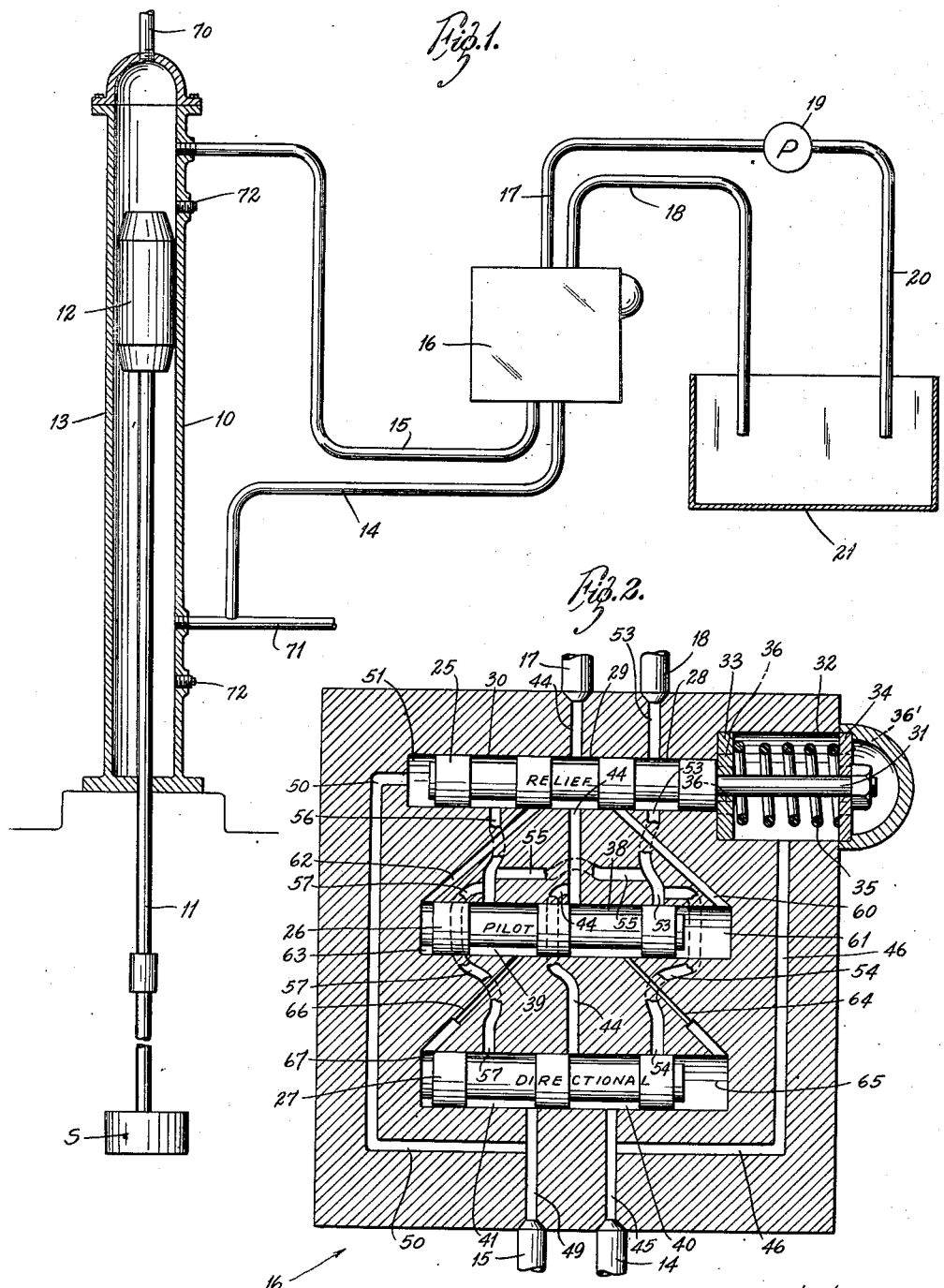

2,517,243

UNITED STATES PATENT OFFICE 2,517,243

PRESSURE CONTROLLED PUMP OPERATING VALVE MECHANISM

Howard E. Rose, Peninsula, Ohio, assignor to Alco Valve Company, University City, Mo., a corporation of Missouri Application February 26, 1944, Serial No. 523,981

1 Claim. (Cl. 121—158)

This invention relates to a pressure controlled pump. More particularly, it involves a pump operating mechanism in which there is a reciprocating pumping device and a reversing mechanism, the latter being operated in response to pressure exerted on the reciprocating device.

It is an object of the invention to provide a pump in which there is a reciprocating pumping member to which pressures are oppositely applied, and in which the reversing mechanism operates in response to existence of a predetermined maximum pressure exerted on the pumping member.

Broadly, it is an object of the invention to provide a reversing pumping device, and a force applying means therefor with means to limit the maximum force applied to the pumping mechanism.

In the drawing:

Fig. 1 is an elevation partly in section of the mechanism; and,

Fig. 2 is a diagrammatical view of the control valve structure.

In the mechanism as shown, which, for illustration, will be described in connection with an oil pump, a reversible force applying means 10 causes a pump connecting rod 11 to be reciprocated in opposite directions. A sucker rod and sucker S, or other like pumping device, disposed in the well, may be attached to the connecting rod 11.

The force applying means 10 includes a piston 12 operating within a cylinder 13, and connected to the pumping rod 11. The cylinder 13 has two fluid lines 14 and 15 connected to the lower and upper parts thereof, respectively. The lines 14 and 15 are connected into a pressure-receiving reversing valve mechanism 16, which, as will be shown, alternately applies liquid under pressure to each of the lines, while connecting the other to exhaust. A pressure line 17 and a discharge line 18 connect into the valve mechanism 16. A suitable pump 19 is connected to the pressure line 17, and receives fluid from line 20. A reservoir is diagrammatically shown at 21, and it contains the supply of oil for the operation of the piston 12. The main outlet from the well is not shown.

The valve mechanism 16 is designed alternately to transmit fluid under pressure from the line 17 to the lines 14 and 15, respectively, and, at the same time, to connect the one of the lines 14 and 15 not receiving fluid under pressure to the exhaust line 18.

The valve mechanism includes three valve elements. There is a first, or relief, valve 25, a second, or pilot, valve 26, and a third, or directional, valve 27. Each of the valves reciprocates in a cylindrically-shaped opening within the body or housing of the valve mechanism 16.

The relief valve 25 has cutaway portions, separated by sealing collars, to provide spaces 28, 29 and 30 (reading from right to left). This valve has an extension 31 at one end operating within an enlargement 32 within the housing. About the extension 31 are oppositely disposed limiting washers 33 and 34 urged to maximum separation by a coil spring 35. The washer 33 has ports 36 to admit fluid therethrough to the adjacent piston-like end of the valve 25. The washer 34 has similar ports 36'. While the spring 35 normally spreads the washers 33 and 34 the maximum distance apart, as shown in the drawing, to hold the valve in a middle position, either of the two washers may be displaced toward the other within the enlargement 32 by movement of the valve in either direction, such displacement acting to compress the spring 35 to a greater degree. The pressure of the spring may be varied by varying the thickness of the washers 33 and 34, or by employing shims behind one or both of them. The ports 36 and 36' in the two washers permit the passage of oil from one side to the other of the washers to permit free movement of the valve itself.

The pilot valve 26 has cutaway portions, limited by sealing collars, to provide two spaces 38 and 39. The directional valve 27 is also provided with cutaway portions, limited by sealing collars, to provide spaces 40 and 41.

The pressure line 17 is connected into a port 44. This port, in turn, is connected into the space 29 of the valve 25. It is also connected into the space 38 of the valve 26 but, as will be shown, shifting of the valve 26 to the right will disconnect it from the space 38 and connect it with the space 39. The port 44 is likewise connected in the space 40 of the valve 27 when that valve is in the position shown, but when that valve shifts, the port 44 will be connected into the space 41 thereof.

It will be seen thus that fluid under pressure is at all times ported to the three valves.

The line 14 is connected with the port 45, which is connected into the space 40 of the valve 27 with the latter in the position shown, and the port 45 is also connected by a port 46 into the pressure chamber 32 at the right end of the valve 25.

The line 15 is connected by a port 49 into the space 41 of the valve 27 with that valve in the position shown. The port 49 is likewise connected by a port 50 with the pressure chamber 51 at the left end of the valve 25.

The exhaust line 18 is connected into a port 53 that communicates with the space 28 of the valve 25. The port 53 is always connected with the valve 26, where it may communicate with the space 38 when that valve is shifted. An exhaust port 54 leads from the port 53 to the chamber of the valve 27, where it may communicate with the space 40 when the valve 27 is shifted.

The port 53 is always in communication, by a cross port 55, with an exhaust port 56 that corresponds to the exhaust port 53. This port 56 communicates with the chamber of the valve 25 and the chamber of the valve 26, where in the position of the valve 26, as shown, it registers with the space 39. A port 57 leads from the port 55 to the chamber of the valve 27, where, in the position shown, it registers with the space 41 of that valve.

An actuating port 60 leads from the chamber of the valve 25 to the pressure chamber 61 at the right end of the valve 26. A similar port 62 leads to the pressure chamber 63 at the left end of the valve 26. A constricted actuating port 64 leads from the space 38 of the valve 26 to the pressure chamber 65 of the valve 27. A similar constricted port 66 leads from the space 39 provided by the valve 26 to the pressure chamber 67 at the other end of the valve 27.

*Operation*

At the start of any operation, the cylinder 13, the reversing valve 16 and the associated parts will be charged with oil or whatever operating fluid is chosen. Some pressure producing means, such as the pump 19, will provide adequately high pressure for the line 17.

Assuming the reversing valve to be in the position shown in Fig. 2, it will be seen that the line 44 throughout its length is receiving oil at high pressure. The valve 25 is in neutral position so that no high pressure oil is distributed through it. However, the valve 26 opens the high pressure line through the restricted port 64 into the pressure chamber 65 to maintain the valve 27 in its left position. The valve 27 thus connects the high pressure port 44 with the line 14 and with the line 46. Through the line 14, high pressure is supplied beneath the plunger 12 and is shown to be elevating that plunger.

The exhaust or relief line 18 is connected into the space 28 of the valve 25, and is thus connected with the port 53 and port 54, which are blocked at the valve 27, but open through the cross port 55 with the port 56, the port 57, which, in turn, are connected through the space 41 of the valve 27 with the port 49, leading to both the line 15 above the plunger 12 and the port 50 at the left of the valve 25. The port 66 likewise communicates through the space 39 of the valve 26 with the port 56.

Thus, in the position of the valve mechanism 16, as shown, the valve 25 is open to high pressure at the right and exhaust at the left, so it may move to the left. The valve 26 is locked, as at the right end it is checked by closure of the port 60 by the valve 25, and at the left end is blocked by closure of the port 62 by the valve 25. The valve 27 is open to high pressure at the right and exhaust at the left. The line 14 is connected to high pressure and the line 15 to exhaust. The plunger is moving up under the force of the high pressure beneath it.

As noted, the unit pressure acting to elevate the plunger is acting through the line 46 against the right hand end of the valve 25. The spring 35 is of such value that the resultant force acting to displace the valve 25 is below the force required to displace that valve when the plunger 12 is offering only its normal resistance to elevation. However, when the plunger reaches the top of its stroke, or after the tapered end of the plunger 12 has passed the port opening for the line 15 and its elevation is otherwise obstructed, the pressure in the line 14 and the passage 46 will build up toward the maximum pressure capacity of the pump 19. The spring 35 is adapted to yield when this pressure attains a predetermined value greater than that normally required to lift the plunger 12 and less than that which would produce destructive forces on the pumping mechanism when movement of the plunger is prevented.

When this critical pressure is obtained, the valve 25 will move to the left, causing a leftward displacement of the washer 34 and compression of the spring 35. This causes the line 44 to be ported into the port 62 through the space 29 of the valve 25. At the same time, the port 60 of the valve 26 is connected through the space 28 of the valve 25, with the exhaust line 53 leading to the line 18. By this means, the valve 26 is forced to the right under the influence of high pressure within the chamber 63 and low pressure within the chamber 61.

When the valve 26 shifts, it cuts the port 44 from the port 64 and opens the latter port to the exhaust line 53. It also cuts the exhaust port 56 from the port 66, and connects the latter port with the high pressure line 44.

These last operations by the valve 26 start the introduction of high pressure to the chamber 67 at the left of the valve 27 and low pressure to the chamber 65 at the right thereof, starting movement of the valve 27 to the right.

The valve 27, in moving to the right, cuts off the exhaust port 57 from the port 49 and cuts off the high pressure port 44 from the port 45. After this last, the continued movement of the valve 27 introduces high pressure from the port 44 to the port 49 wherein it may act against the other side of the plunger 12 through the line 15, and may also build up in the port 50 against the opposite end of the valve 25. Such movement also connects the line 14 and port 46 to the exhaust line 54 through the space 40 of the valve 27.

It will be seen that it is essential to secure a complete travel of the valve 27 before the pressure maintaining the valve 25 out of neutral position is relieved. The shifting pressures acting upon the valve 27 are under the immediate control of the valve 26 so that the position of the latter valve is the immediate determinant of the position of the valve 27. So long as the valve 26 is completely moved, the porting conditions will be proper for positioning of the valve 27. The shifting of the valve 26 is under the direct control of the valve 25 and this, in turn, is under control of the valve 27.

The restricted port 66 insures a slow action of the valve 27 relative to the action of the valve 26. Consequently the valve 26 will move rapidly and the valve 27 slowly relatively thereto. Thus the valve 27 is not permitted to shift to relieve the displacing pressure on the valve 25 until the valve 26 is fully displaced.

The foregoing valve construction eliminates the necessity of using snap-action mechanism to insure a complete displacement of the valve 27.

As soon as the valve 27 does move to relieve the pressure in the port 46, the spring 35 will return the valve 25 to neutral position. It will not shift beyond neutral position under the influence of the pressure now introduced to its other end in the chamber 51 because the plunger 12 now descends and the pressure in the line 14 is below the critical pressure of the spring 35 until the lower taper on 12 restricts the outlet for the line 14.

In this new position of the reversing valve mechanism 16 the valve 25 is in neutral position which traps the high pressure fluid within the chamber 63 of the valve 26, and also prevents introduction of any high pressure to the chamber 61 by closing the port 60. The port 66 of the valve 27, however, is constantly open to high pressure and the other port 64 thereof is constantly open to exhaust. The lines 14 and 46 are open to exhaust through the space 40 of the valve 27, the port 54, the port 53, and the line 18.

It will be observed that the exhausting of the line 14 cannot take place until all three valves are in suitable position. The two valves 26 and 27 must be in the right hand position.

The reversing valve 16 will remain in the position thus described until the resistance to downward movement of the plunger 12 attains a value exceeding the critical reversing pressure of the valve mechanism 16. Thereupon the valve mechanism 16 will again reverse by the attaining of a pressure within the chamber 51 of the valve 25 sufficient to overcome the resistance to the spring 35, with the result that the valves 26 and 27 will again be shifted to the left so that the port 14 is again under high pressure and the port 15 connected to exhaust.

It will be seen that the critical pressure for shifting of the valve mechanism 16 is a function of the areas of the ends of the valve 25. These areas have here been shown as equal, which will result in shifting of the valve mechanism at the same pressure on the upward and the downward stroke of the plunger 12. These areas, of course, may be different, in which event a different pressure will be required to operate the plunger 12 upwardly from that required to operate it downwardly.

Ordinarily, a counter-balancing mechanism is provided. This, however, forms no part of the present invention but may take the form of a counter-weight device attached to the plunger 12 through a sealing conduit 70 at the top of the cylinder 13, or a fluid pressure means connected at 71 into the line 14.

It will be seen that the foregoing pumping mechanism gives high protection to the various pumping elements. Any obstruction that stops the pump and the plunger will not cause an excessive force to be applied, nor even to stop the pumping operations, as is the case with mechanical pumping devices, which do not reverse until mechanical trip means are actuated at the ends of the stroke. With the present mechanism, any obstruction will merely cause the hydraulic pressure to reach its critical value prior to completion of the pump stroke. Consequently, the stroke will be reversed from this intermediate point. In many instances, repeated cycling of the pump mechanism on limited stroke acting against the obstruction will dislodge the same. In any case, it will be evident that the pump is operating on a limited stroke and suitable steps may be taken to remove the obstruction. Although, pumping will be continued to the extent permitted.

The critical pressure, as determined by the spring 35, will be held within the maximum safe limits of the strength of the pumping mechanism. In ordinary cycling, the critical pressure is built up by whatever normally limits the pump stroke. If such limiting means is provided for the plunger 12, rather than for the sucker means within the well, the pump rod will not be required to be subjected to even the force produced by this critical pressure. Furthermore, different springs may be used to provide different critical pressures, or the spring tightened by its nut and screw and shims provided to stabilize its neutral position. Such shims will be used behind either the washer 33 or the washer 34.

The length of stroke or range of stroke can be adjusted by varying the position of attachment of lines 14 and 15 to the cylinder 13. A pair of plugs 72 is shown for such purpose.

What is claimed is:

In a pump operating mechanism, a device adapted to be moved back and forth, a first fluid line connected to one side of the device, a second fluid line connected to the other side of the device, a high pressure fluid line and a low pressure line, and a reversing valve mechanism connected to the four lines, said valve mechanism being adapted to connect the high pressure fluid line to the first fluid line and the low pressure line to the second fluid line, and means in the reversing mechanism responsive to predetermined pressure in the first pressure line, to reverse the connections and connect the first fluid line to the low pressure line and the second fluid line to the high pressure line, said means including a first valve movable to select one or the other of the connections aforesaid, and fluid pressure means to move the first valve, said last means including a pressure-responsive device connected by the first valve to receive oppositely the pressures of the two fluid lines, and oppositely shiftable when the difference in said pressures in said lines attains a predetermined value, and means operated by shifting of said device, for effecting the movement of the first valve to reversing position, said means including a pilot valve operated by operation of the pressure-responsive device, and means to prevent displacement of the first valve prior to full movement of the pilot valve.

HOWARD E. ROSE.

REFERENCES CITED

The following references are of record in the file of this patent:

UNITED STATES PATENTS

| Number | Name | Date |
|---|---|---|
| 1,938,758 | Ernst | Dec. 12, 1933 |
| 1,952,690 | Strom | Mar. 27, 1934 |
| 2,018,215 | Lausen | Oct. 22, 1935 |
| 2,070,720 | Ernst | Feb. 16, 1937 |
| 2,165,966 | Hall et al. | July 11, 1939 |
| 2,185,448 | Suter | Jan. 2, 1940 |
| 2,223,792 | Muir | Dec. 3, 1940 |
| 2,263,086 | Hall | Nov. 18, 1941 |
| 2,287,709 | Ringman | June 23, 1942 |
| 2,298,457 | Berges | Oct. 13, 1942 |